Oct. 3, 1939.　　　L. C. JOSEPHS, JR　　　2,174,662
TRANSMISSION
Filed July 15, 1937　　　4 Sheets-Sheet 2
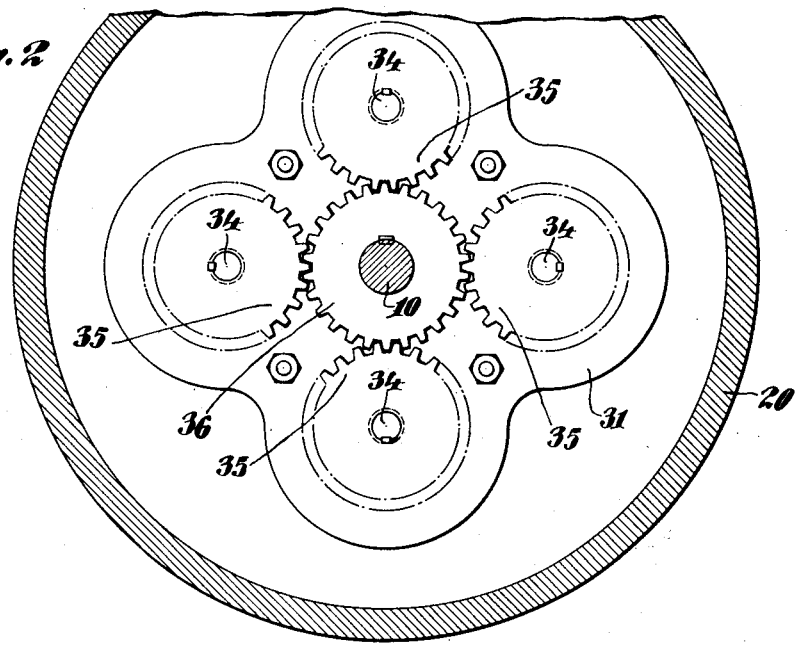
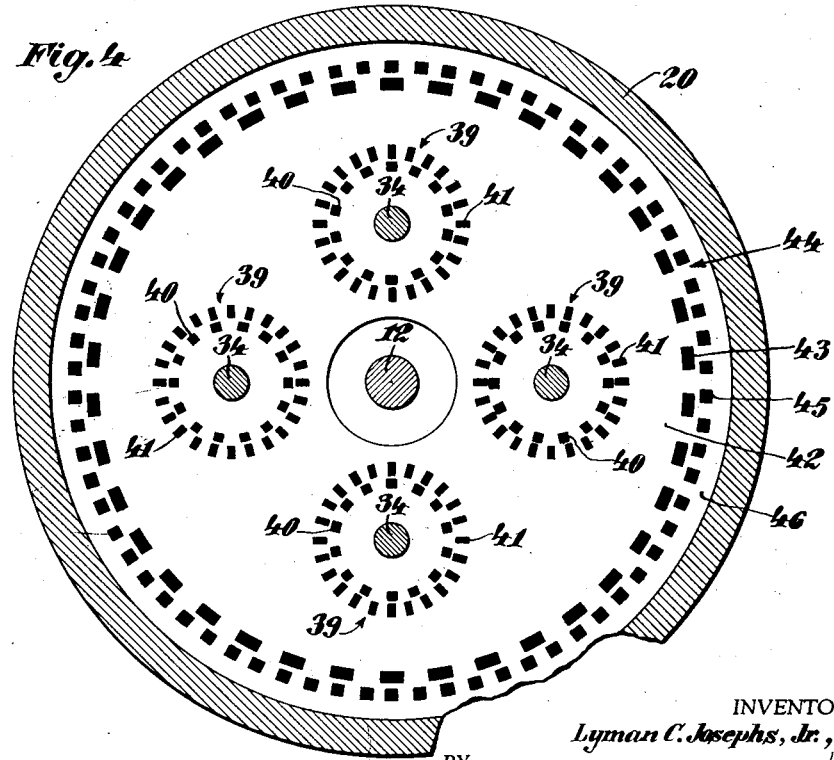
INVENTOR.
Lyman C. Josephs, Jr.,
BY
HIS ATTORNEYS Oct. 3, 1939.                L. C. JOSEPHS, JR                2,174,662
                                 TRANSMISSION
                              Filed July 15, 1937            4 Sheets-Sheet 3

INVENTOR.
Lyman C. Josephs, Jr.,
BY Hoguet, Neary & Campbell,
HIS ATTORNEYS

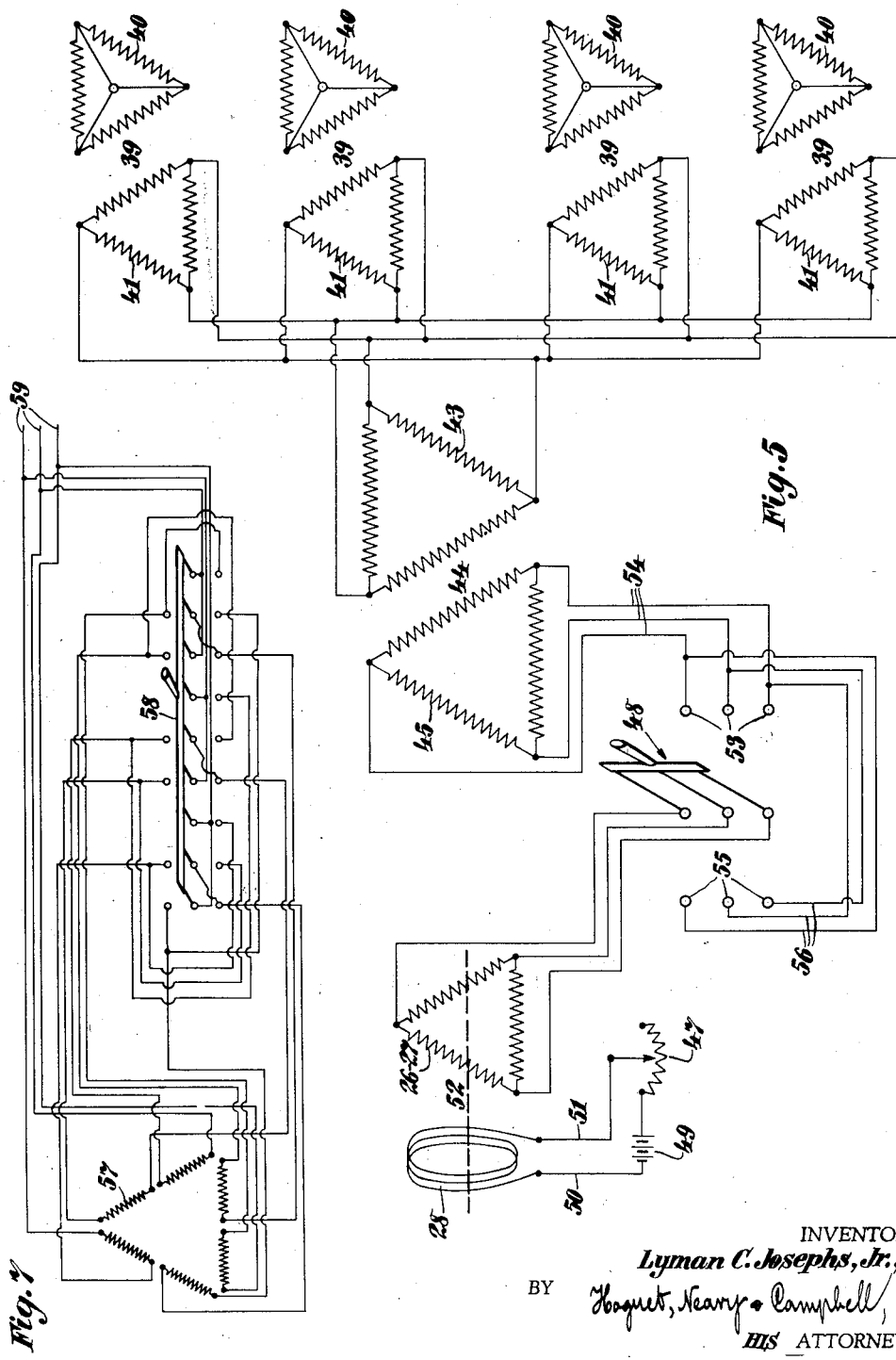

Patented Oct. 3, 1939

2,174,662

UNITED STATES PATENT OFFICE 2,174,662

TRANSMISSION

Lyman C. Josephs, Jr., Allentown, Pa.

Application July 15, 1937, Serial No. 153,724

8 Claims. (Cl. 172—239)

My invention relates to the transmission of power from a primary source of power to a machine that will utilize this power, and more particularly to an automatic torque converter or transmission for motor vehicles or industrial machinery.

One of the principal features of my torque converter or transmission is the flow of mechanical and electrical power through multiple paths.

Another feature of my transmission is the use therein of an electric motor in which a planetary gear system is built and power applied on the planetary pinion shafts.

A further feature of my invention is a pole changing means for providing definite fixed speeds for the transmission motor.

The device of my invention, which may perhaps be best characterized as an automatic torque converter, has its best field of utility wherever heavy loads have to be accelerated from standstill or where operation at variable sped from a constant speed prime mover is required. Specific but non-limiting examples of its application are; ship propulsion, locomotives and railways cars, automotive drives and drives for heavy machinery, such as rolling mills, calender rolls, etc. A desirable feature provided for in this device consists of means to vary the speed and torque at the output end with reference to the input end. The control of this variation may be either manual or automatic and responsive to the limitations imposed by one or more of the conditions of operation, such as the available energy and speed-torque characteristics of the prime mover or such as the speed torque requirements of the driven load. The control might also be merely a delayed action type responsive only to time.

Many developments have been made heretofore in this field of torque conversion. Mechanical transmission devices with multiple fixed speed ratios both manually and automatically controlled have been developed and put into use. Also, electric generator-motor drives which provide variable speed ratios are not new, and hydraulic or pneumatic equivalents of the electric drive of my invention have been developed. Another class of prior devices consists of the planetary gear transmission combined with various types of brakes or clutches providing for smooth transition from one speed ratio to another. Still another known type consists of mechanical transmissions employing cones or their equivalent to secure variable speed ratios.

All of the foregoing prior art devices have fallen short of the ideal device because of complications or limitations imposed by weight, cost, low efficiency or large bulk. The tremendous continuous development in this field has indicated the lack of satisfaction with existing devices.

My present invention covers a new scheme for the transmission of power which basically employs two or more paths for the flow of mechanical and electrical power from the driving to the driven end of the device. The proportioning of the amount of power flowing through each of these multiple paths is by means of differential devices at each end of the paths.

In accordance with the present invention two different types of power transmission are employed in parallel and by means of the differential devices the proportion of power flowing through each of these parallel paths will be varied according to the ratio of speeds between the driving and driven ends of the mechanism. In one embodiment one path is mechanical by gearing and the other path electrical by generator and motor. At low speeds of the driven end most of the power flows through the mechanical path and as the speed of the driven end increases a larger proportion of the power will flow through the electrical path.

The novel features of my invention are set forth with particularity in the appended claims. The invention itself, however, both as to organization and method of operation, will be easily understood from the following description taken in conjunction with the accompanying drawings, which illustrate one specific but non-limiting example of the invention.

Figure 2 is a cross-section view taken along lines 2—2 of Figure 1 showing the input planetary gear system;

Figure 4 is a sectional view taken along lines 4—4 of Figure 1 showing the electric motor part of the transmission;

Figure 5 is an electric wiring diagram showing the various connections between windings in different parts of the transmission;

Figure 7 is an electric wiring diagram showing the connectors for providing a pole changing switch between the generator and the motor units of the transmission.

Figure 1:
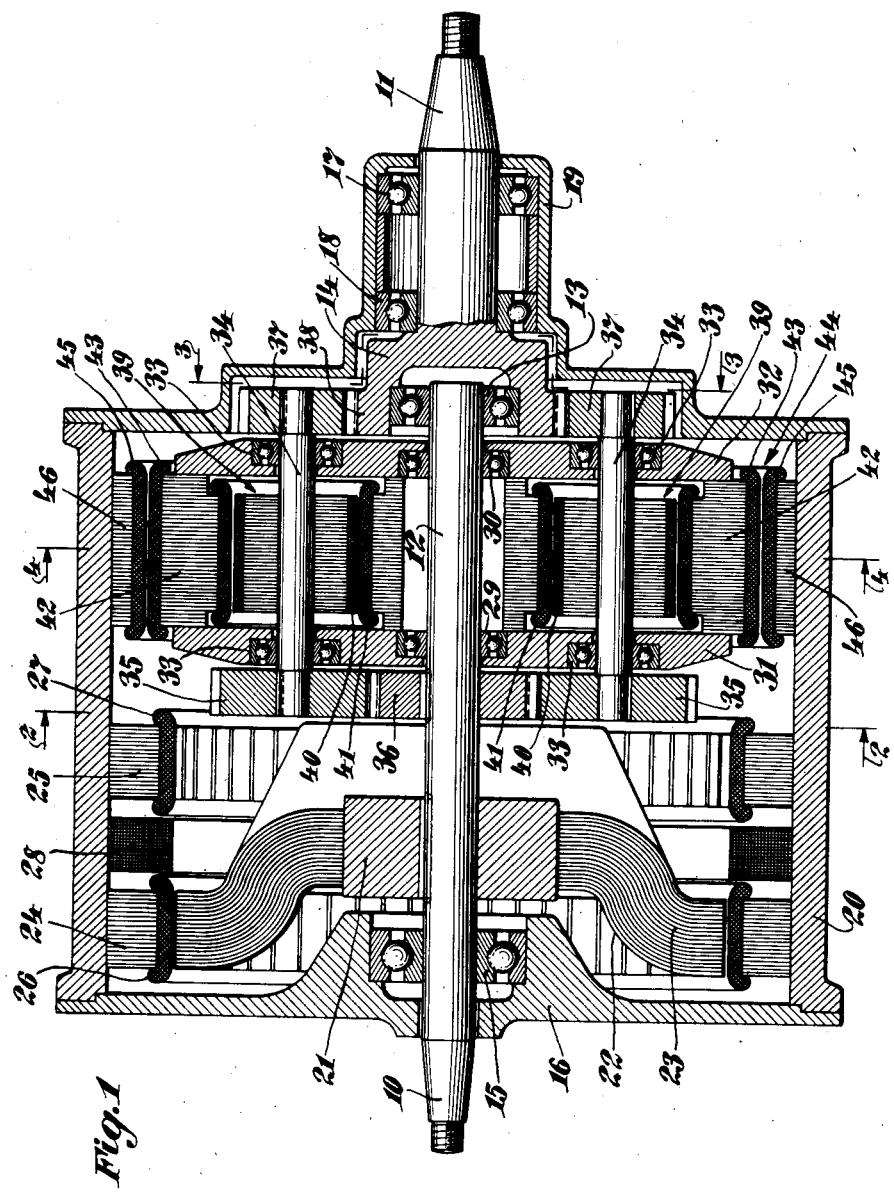
Figure 1 is a longitudinal sectional view of a complete transmission constructed in accordance with my invention.

Referring first to Figure 1, 10 is the input shaft and 11 is the output shaft. In practice the former is connected to any primary source of power, not shown, and the latter is connected to any machine, not shown, that would use the power transmitted by this device. The input shaft 10 is provided with an extension 12 carried in bearing 13, which is mounted in the enlarged portion 14 of the output shaft 11. The input shaft 10 is also carried in bearing 15 mounted in the end frame 16 of the complete transmission. This end frame may be made of aluminum or other non-magnetic material. The output shaft 11 is also carried in bearings 17 and 18 mounted in the other end frame 19 of the transmission. This also may be of non-magnetic material. Thus it will be seen that the two shafts 10 and 11 are so mounted as to revolve coaxially within the main frame 20 of the transmission but are free to revolve at variable speeds.

On a suitable spider 21, carried by the input shaft 10, is mounted an inductor 22 consisting of a stack of corrugated four-lobed thin sheet steel laminations 23. Within the main frame 20, which is made of magnetic material, are mounted two armature cores 24 and 25, consisting of the conventional assembly of toothed laminations customarily used for the stator of alternating current generators. In the slots of these laminations are wound the usual type of windings 26 and 27 connected together so as to form four, three phase distributed poles customarily found in alternating current generators. There is a small air gap between the inductor 22 and the armature cores 24 and 25. Between the cores 24 and 25 is mounted the exciting winding 28 consisting of many turns of insulated wire wound concentrically with the longitudinal axis of the transmission. This winding 28 receives electrical energy from a battery connected thereto as shown in Figure 5 and explained hereinafter.

The device described in the preceding paragraph utilizing parts 21—28 is of the well known inductor type of alternating current generator. Any other type of generator could be used although the inductor type is preferred in this design because of the absence of collector rings or brushes whereby the generator may be built into an enclosed case with the gears and lubricating oil.

Mounted on the extension 12 of the input shaft 10 are two bearings 29 and 30 which carry the two similar spiders 31 and 32. These two spiders are bolted together to form a single structure carrying the eight bearings 33 which in turn carry the four shafts 34, only four of the bearings and two of the shafts being shown in the sectional view in Figure 1. At one end of these shafts 34 are mounted four gears 35, shown in detail in Figure 2. In the specific but non-limiting embodiment shown in Figure 2, the four gears 35 each have twenty-five teeth which mesh with a central or sun gear 36. The sun gear 36 is mounted on the input shaft 10. The gears 35 and 36 form a planetary train.

Figure 3:
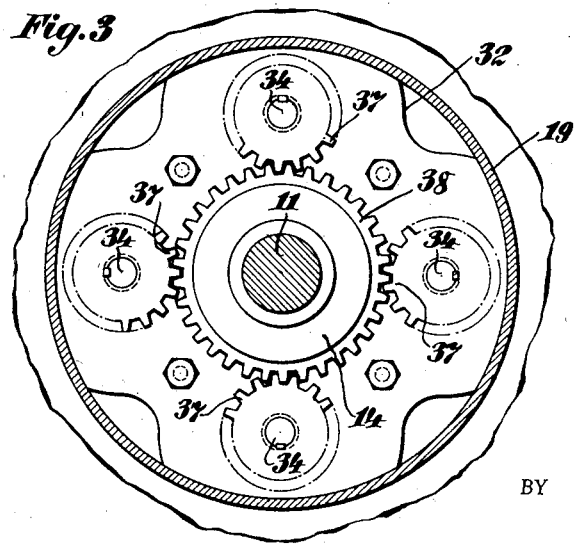
Figure 3 is a cross-section view taken along lines 3—3 of Figure 1, showing the output planetary gear system.

At the other end of the four shafts 34 are mounted four pinions 37 shown in detail in Figure 3. In this specific example each pinion has seventeen teeth which mesh with gear 38. Gear 38 is mounted on the output shaft 11.

In the space between the two spiders 31 and 32, shown in Figure 1, and coaxial with the shafts 34 are four small squirrel cage type induction motors 39 of which 40 are the rotors and 41 are the four pole, three-phase stator windings. These squirrel cage motors 39, only two of which are shown in the sectional view in Figure 1, are so named in the description for identification, although in much of the operation of the transmission they will function as asynchronous generators. The punched laminations 42 of sheet steel in which these stator windings 41 are mounted are continuous between the four squirrel cage motors 39 and are clamped in place by the spiders 31 and 32. The outer periphery of these laminations 42 is toothed and receives windings 43, thus making the whole spider 31—32 into the armature of an induction motor 44 of the wound rotor type of which the four pole, three-phase stator winding is 45 carried in the stator core 46 mounted in the frame 20. An air gap is provided between the cores 42 and 46.

It will be seen in Figure 4, which is a section though the parts described just above in connection with Figure 1, that the outer slots and windings form a conventional type of induction motor 44 with windings on both the stator and rotor. The rotor in turn is mounted on a spider carrying within it four small squirrel cage type induction motors 39, the rotors of which are attached to the shafts connecting the planetary pinions of the two planetary trains of gears shown in Figures 2 and 3.

Referring now to Figure 5, the electrical connections are made from the generator armature windings 26 and 27 to the main induction motor stator windings 45; also from the main induction motor rotor windings 43 to the squirrel cage induction motor stator windings 41, thus placing the four squirrel cage motors 39 in cascade connection to the main motor 44. The current in the exciting winding 28 of the generator may be controlled by the rheostat 47.

The connections between the generator windings 26 and 27 and the main motor windings 45 may be reversed by means of a switch 48. The connections between the rotor windings 43 of the main motor 44 and the four stator windings 41 of the squirrel cage motors 39 are fixed in accordance with the design characteristics desired in the transmission.

The generator 52 in Figure 5 has been shown as a conventional three-phase winding, delta connected. Many other types of winding may be used to secure different characteristics. For example, in Figure 7 is disclosed a wiring diagram of a circuit and generator by which the frequency of the current may be increased. The generator windings 57 are formed in two sections distributed in the core slots of the generator which by means of a suitable switch 58 may be grouped as a four-pole three-phase winding or an eight-pole, three-phase winding. The three-phase wires 59 are connected to the main motor windings 45 in the manner described above. When the switch 58 is moved upwardly to close the circuit, the generator windings 57 are connected in a four-pole three-phase relation. With the switch 58 reversed, the generator windings 57 are grouped and connected in an eight-pole, three-phase relation.

According to one illustrative but non-limiting embodiment the transmission of my invention may be operated as follows:

The shaft 10 is connected to a suitable prime mover revolving at say 1800 R. P. M. in a counter-clockwise direction looking from the left. The output shaft 11 is connected to and held stationary by the load to be driven. No current is flowing in the excitation winding 28 and therefore no electricity is generated or passing through any of the windings. Under these circumstances the sun pinion 36, shown in Figure 2, will react on planetary gears 35 which in turn through shafts 34 will cause planetary pinions 37, shown in Figure 3, to react on sun gear 38, which is stationary. This will cause a precession in the clockwise direction of the planetary spider 31—32. The speed of this spider is fixed by the ratios of the two planetary gear trains shown in Figures 2 and 3 and in the specific case illustrated will be approximately 2100 R. P. M. The small squirrel cage motors 31 will rotate in a clockwise direction at a speed of approximately 4050 R. P. M. with reference to the spider 31—32. Under these circumstances no torque except the friction drag of the gears will be delivered to the stationary output shaft 11.

Electric current from the battery 49, shown in Figure 5, is now admitted through the rheostat 47 and lead wires 50 and 51 to the excitation winding 28 of the generator 52. The corrugated inductor 22 revolving at 1800 R. P. M. within the windings 26 and 27 disposed to form four distributed poles in three phases will now induce in these windings a 60 cycle alternating current of intensity and voltage determined by the dimensions of the windings and the strength of the magnetic flux induced by the exciting coil 28.

The current will now flow through the switch 48, switch contacts 53, and lead wires 54 to the main motor windings 45 inducing in these windings a revolving magnetic field in accordance with well known phenomena of the induction motor. The connections through the switch 48 are such that this field revolves in a counterclockwise direction, the same as the direction of the input shaft 10. Windings 45 are three phase four pole and the speed of the revolving magnetic field will be 1800 R. P. M. This revolving magnetic field will tend to cause the main motor rotor windings 43 to revolve in the same direction at a speed slightly less than 1800 R. P. M. These windings, however, and the spider 31—32 are already revolving at a speed of 2100 R. P. M. in the opposite or clockwise direction by mechanical drive through the planetary gear trains and shafts shown in Figures 2 and 3 as described above. The revolving magnetic field will, therefore, act as a brake tending to slow down the spider 31—32. The intensity of this braking effect is determined by the intensity of the current flowing in the windings 43, which in turn is controlled by the intensity of the current in the exciting winding 28. Thus by control of the rheostat 47 more or less braking effect can be applied to the spider 31—32.

The spider 31—32, however, cannot slow down without either of two occurrences. Either the input shaft 10 has to slow down or the output shaft 11 has to revolve. Assuming that the prime mover can furnish sufficient power so that shaft 10 will not slow down, then by application of sufficient braking force to the spider 31—32 the output shaft 11 will start to rotate in a counterclockwise direction receiving its torque from the reaction of the gears in the planetary gear train shown in Figure 3. This torque is derived from the input shaft in the form of mechanical power transmitted through the two planetary trains shown in Figures 2 and 3.

The main motor shown in section in Figure 4 is operating in a direction opposed to the direction in which it would be driven electrically and is therefore acting as a brake to produce the same results as usual in planetary gear transmissions having a band brake, with this exception: In this case the spider 31—32 functions as a flywheel operating at considerable speed. As this speed is reduced by the above mentioned braking action considerable kinetic energy is given up. Not all of this energy is released in the form of heat as in the case of a band brake, but part of this energy is returned electrically to the system for useful work through the small squirrel cage motors 39 and partly through electrical regeneration through the generator windings 26 and 27, as will be explained in more detail below, in discussing the function of the small squirrel cage motors 39.

It will become apparent from the foregoing that by suitable control of the rheostat 47 variable amounts of torque can be delivered to the output shaft 11 up to the limitations of the power supplied by the prime mover to the input shaft 10. The torque output at shaft 11 cannot exceed the torque input at shaft 10 by more than the fixed ratio of the two planetary gear trains, shown in Figures 2 and 3, plus the torque developed electrically in the main and squirrel cage motors. In the specific embodiment described above this might represent a maximum torque multiplication of three and a half or three and a quarter to one. The control can be as smooth and gentle as desired by suitable control of the rheostat 47, so that from standstill, output shaft 11 can be gradually accelerated until its speed has reached a speed at which the spider 31—32 has slowed down until it is stationary. In the case of the design described above, this would occur at an output speed of about fifty-four per cent of the input speed. In actual operation this point would have no distinction, and transition from below standstill speed to above would be smooth. Before describing what occurs when the output shaft 11 exceeds the speed at which the spider 31—32 is at standstill, it is first advisable to make clear the function of the squirrel cage motors 39.

In the design herein described, the ratios in the two planetary gear trains shown in Figures 2 and 3 are chosen so as to force the squirrel cage motors 39 on shafts 34 in the spider 31—32 to run at a speed such that they will act as asynchronous generators, that is, above their normal synchronous speed. The ratio between the motors 39 and the main motor 44 is fixed so that the squirrel cage motors 39 are acting as generators for which driving power must be supplied. These motors 39 are therefore always tending to slow down, exerting a drag of an amount that can be fixed by the proportions of the design.

Figure 6:
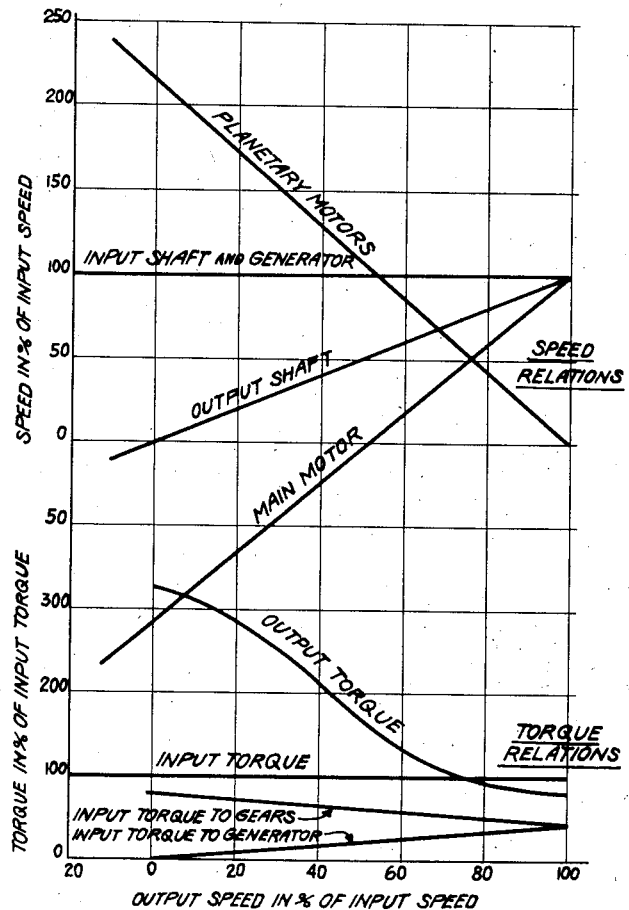
Figure 6 is a chart showing the relations between speed and torque of the various elements of the transmission.

By reference to Figure 6 showing the relative speeds of various parts of the transmission mechanism, it will be noted that the squirrel cage or planetary motors 39 run at their highest speed when output shaft 11 is at standstill and come to rest when output shaft 11 is at equal speed to input shaft 10. The action of these squirrel cage motors 39, therefore, is constantly to tend to slow down, and by this action to tend to accelerate the output shaft 11. This action will be automatic and can be made of constant intensity by proper choice of design proportions.

From the foregoing description it will be seen that my transmission device will not only develop increased torque at low speeds of the ouput shaft, but will tend to approach automatically a 1:1 ratio between input and output shafts.

It should be noted that from the start of the output shaft 11 up to the point where the spider 31—32 comes to standstill, the main motor 44 is being forced to run backwards. Under these circumstances the frequency in the secondary circuit of the main motor 44 and the primary circuit of squirrel cage motors 39 will be raised beyond that impressed on the primary circuit of motor 44. This in turn requires the squirrel cage motors 39 to run at a still higher speed to be above synchronism and thus act as generators. Accordingly, it will be noted that at the start when output shaft 11 is stationary, the main motor 44 is operating backwards at approximately 2100 R. P. M. The impressed frequency on its primary results in a revolving field of 1800 R. P. M. The resultant field, therefore, revolves at 2100 plus 1800 or 3900 R. P. M. or at a frequency of 259 cycles. The squirrel cage motors 39 will be running at approximately 4050 R. P. M. or 4% above synchronism and operating as generators.

According to another example, when the output shaft 11 is operating at 30% of the speed of the input shaft 10 or 540 R. P. M., the main motor 44 will be running 900 R. P. M. backwards and the synchronous speed of the squirrel cage motors 39 will be 2700 R. P. M. These motors are in practice, however, running at 2880 R. P. M., which is 6⅔% above synchronous speed and will therefore still be acting as generators with greater output than before.

As a third example, consider what happens when the speed of the spider 31—32 and the main motor 44 is zero. The main motor 44 now becomes a stationary transformer. The input shaft 10 will run at 1800 R. P. M. counterclockwise looking from the left. The output shaft 11 will run at a speed of approximately 971 R. P. M. counterclockwise. The generator 52 will generate three phase alternating current at a frequency of 60 cycles and the squirrel cage motors 39 will run at a speed of approximately 1890 R. P. M. or 5% above their synchronous speed of 1800 R. P. M. The squirrel cage motors 39 will tend to slow down further. The main motor 44 while acting as a stationary transformer will produce a definite torque in a counterclockwise direction in accordance with the usual characteristics of an indution motor at standstill. In addition, there will be the counterclockwise torque in sun gear 38 produced through the planetary gear trains shown in Figures 2 and 3.

If all of these torques are sufficient to further accelerate the load attached to output shaft 11, the speed of that shaft will increase. As the speed of shaft 11 increases, the torque from motor 44 will follow the usual characteristics of an induction motor and the motor will rotate in a counterclockwise direction. The torque produced through the planetary gear trains shown in Figures 2 and 3 will decrease due to the reaction torque produced in these trains by the main motor 44, and the squirrel cage motors 39 will produce a diminishing torque effect as main motor 44 approaches its synchronous speed, which is the speed of the input shaft 10.

Theoretically, the synchronous speed of the concatenated motors 39 and 44 would be half the speed of the generator 52 because the generator has four poles and each motor has four poles, making a concatenated combination of eight poles. The fact that the two concatenated motors are connected together so that while one tends to run faster the other tends to run slower will finally result in motors 39 coming to a stop when the main motor 44 reaches a speed synchronous with the generator 52. Theoretically, it would never be possible to reach synchronous speed without the aid of some outside force or agency as an induction motor must run with some slip to provide the secondary current necessary to produce torque. The squirrel cage motors 39 in this case are so geared as to act always as asynchronous generators with respect to the main motor 44. A very slight amount of slip, therefore, will be required to produce sufficient secondary current in motor 44 to provide the required torque, and the output shaft 11 may therefore reach a speed approximating 98% or 99% of the input shaft 10.

In the foregoing description the speed of the input shaft 10 was assumed fixed at 1800 R. P. M. This was done to simplify the calculations on the basis that the electric current generated would be at a frequency of 60 cycles. At other speeds of the prime mover above or below 1800 R. P. M., the operation of the transmission would be the same except that electrical frequencies and synchronous speeds would be changed in direct proportion to the change in speeds. To maintain the same power output the magnetizing current in coil 28 would have to be increased as the speed were lowered and decreased as the speed were raised. The fact that this magnetizing current has to be changed in inverse ratio to the speed of the input shaft to maintain constant power makes for stability of the operation of the transmission particularly when used with a prime mover having constant torque characteristics.

If the load driven by the output shaft 11 becomes greater than the torque then being supplied by the transmission, the output shaft 11 will slow down until sufficient torque is produced to meet the requirements of the load. If, however, the amount required is beyond the limits of the design, the output shaft 11 will come to rest and some of the energy of the prime mover will go into the transmission in the form of electrical energy in the windings and mechanical energy in spinning the gears and the speed of the prime mover will rise unless restrained.

If the direction of rotation of the prime mover is reversed, the transmission will function exactly the same as described above, except that the connections to the main motor 44 through the switch 48 will have to be changed to reverse the direction of the revolving field. This may be effected by throwing the switch 48 to the left so that connection is made with the contacts 55 and current flows through lead wires 56. My transmission may, therefore, be used with a prime mover having rotation of either hand.

In the case where the torque required by the load not only goes to zero, but reverses so that the load attempts to furnish power back to the prime mover, for example, a motor vehicle running down grade, the main motor 44 will tend to run above synchronous speed and will become an asynchronous generator. Through it electrically and through the gear trains in Figures 2 and 3, the output shaft 11 will supply power back to input shaft 10 causing the speed of the transmission and prime mover to rise. Thus, as in a conventional automotive transmission, it is possible to drive the engine by the car.

When it is desired to hold the transmission in a fixed ratio between input and output shafts, this may be done by careful manipulation of the rheostat 47 so that having once reached a certain speed ratio the excitation will not be sufficient to carry the sequences any further. In most cases, however, it will be more convenient to go through the sequence until an approximately 1:1 ratio of input to output speed is reached and then vary the output speed by variations of input speed at the prime mover.

When it is desired to reverse the direction of rotation of the output shaft 11 with respect to the input shaft 10, the following may take place. When output shaft 11 is at standstill the main motor 44 is being driven at slightly more than the speed of the input shaft 10, but in an opposite direction. By reversing the polarity of the windings of main motor 44 by manipulation of the switch 48 it is possible to make motor 44 run as a motor at a still higher speed, developing torque, which through the planetary trains in Figures 2 and 3 will produce torque in the output shaft 11 in a clockwise direction. The amount of torque that can be thus developed in main motor 44 is limited by the capacity of the squirrel cage motors 39 and will not be as great as the maximum torque that can be developed in the counterclockwise direction.

By changing the number of poles on the generator or motor as suggested in Figure 7, it is possible to alter the relation between frequency of current generated in the generator 52 and the synchronous speed of motor 44. By this means the effect of additional ratio combinations between input and output shaft speeds can be secured, both in the forward and reverse directions.

It will be seen from the foregoing description that a number of new principles in transmission construction and operation have been illustrated. Many variations are possible in the mechanical and electrical design of the transmission. Various other types of differential or planetary gear trains might be employed or other types of electrical machines either alternating or direct current. The novel motor construction described above comprising a main motor with a built-in planetary gear train and a plurality of smaller planetary motors has utility in connection with various industrial devices other than transmissions. Therefore, its novelty and utility are not to be limited to its application to motor vehicle or industrial transmissions. Some of the novel features of my transmission, including the novel motor electric construction, are defined in the appended claims.

I claim:

1. A variable speed transmission comprising a driving rotor, a driven rotor, a planetary gear train connected to said driving rotor, a second planetary gear train connected to said driven rotor, means connecting the first and second gear trains and cooperating with said first mentioned gear train to effect rotation of said driven rotor in accordance with the rotation of said driving-rotor and a plurality of dynamo-electric machines mounted upon the planetary gear trains connecting means acting to resist operation of the planetary gear trains and to cause the driving and driven rotors to operate at substantially the same speed.

2. A variable speed transmission comprising a driving shaft, a driven shaft, a sun gear fixed to each of said shafts, a plurality of planetary gear trains cooperating with each of said sun gears and supported on the rotor of an electric induction motor to effect rotation of the rotor in one direction in response to rotation of the driving shaft, and means responsive to rotation of the driving shaft comprising an alternating current generator for supplying electrical energy to said motor to tend to rotate the rotor in a direction opposite to said one direction and cause the driven shaft to rotate.

3. A variable speed transmission comprising a drive shaft, a driven shaft, a spider forming the rotor of an electric induction motor associated with and rotatable with relation to said shafts, planetary gear trains connecting said rotor to said shafts and causing rotation of said rotor in one direction upon rotation of the drive shaft, means comprising an alternating current generator for supplying electrical energy to said motor to tend to cause said rotor to rotate in a direction opposite to said one direction, and means controlling the amount of electrical energy supplied to said motor to vary the rate of rotation of the rotor and cause the driven shaft to be actuated in response to rotation of the drive shaft.

4. A variable speed transmission comprising a drive shaft, a driven shaft, a spider forming the rotor of an electric motor associated with and rotatable with relation to said shafts, a plurality of dynamo-electric machines in said spider having shafts thereon provided with planetary gears cooperating with said drive and driven shafts to cause the rotor to rotate in one direction in response to rotation of said drive shaft, means for supplying electrical energy to said motor and to said machines to cause them to resist rotation of the rotor in said one direction, and means for varying the amount of electrical energy supplied to the motor and machines to vary the rate of rotation of the rotor and cause the driven shaft to be actuated in response to rotation of the drive shaft.

5. The transmission set forth in the preceding claim in which the means for supplying electrical energy comprises a generator actuated in response to rotation of the drive shaft.

6. A variable speed transmission comprising a drive shaft, an alternating current generator actuated by said drive shaft, a driven shaft, a spider forming the rotor of an induction motor associated with and rotatable with respect to said shafts, a plurality of dynamo-electric machines mounted in said spider and having shafts provided with planetary gears cooperating with said drive and driven shafts to cause said spider to rotate in one direction in response to rotation of said drive shaft and to drive said machines as asynchronous generators, said generator supplying current to said motor and machine tending to cause the motors to resist rotation of the spider in said one direction and means for varying the amount of current generated by the generator to vary the relative speeds of rotation of the drive and driven shafts.

7. A variable speed transmission comprising a driving rotor, a driven rotor, an electric current generator including an armature fixedly connected to said driving rotor, an electric motor including an armature rotatably mounted on said driving rotor for controlling the speed of said driven rotor, a planetary gear system including a plurality of shafts rotatably mounted in the armature of said electric motor and supporting the rotary armatures of a plurality of dynamo-electric machines, the operation of said electric motor being controlled by the torque applied by the dynamo-electric machines associated with said pinion shafts, said motor and dynamo-electric machines being in circuit with said generator and energized by the current supplied by said generator to resist relative rotation of said shafts.

8. A variable speed transmission comprising a drive shaft, a driven shaft, a spider forming the armature of an induction motor rotatable with respect to both shafts, a plurality of synchronous motors having their field windings mounted in said spider and their armatures mounted on shafts journaled in the said spider, an alternating current generator driven by said drive shaft and supplying alternating current to drive said induction motor in one direction and to energize the field windings of said synchronous motors, and cooperating gears on said drive, driven and synchronous motor shafts forming a planetary gear system tending to drive the armature of said induction motor counter to said one direction on rotation of said drive shaft and driving the armatures of the synchronous motors a higher than synchronous speed whereby they act as generators and exert a torque resisting rotation of said spider by the planetary gear system.

LYMAN C. JOSEPHS, Jr.

CERTIFICATE OF CORRECTION.

Patent No. 2,174,662.      October 3, 1939.

LYMAN C. JOSEPHS, JR.

It is hereby certified that error appears in the printed specification of the above numbered patent requiring correction as follows: Page 5, second column, line 55, claim 6, for the word "motors" read motor and machine; and that the said Letters Patent should be read with this correction therein that the same may conform to the record of the case in the Patent Office.

Signed and sealed this 31st day of October, A. D. 1939.

(Seal)      Henry Van Arsdale, Acting Commissioner of Patents.